US012733739B2

(12) United States Patent
O'Doherty et al.

(10) Patent No.: US 12,733,739 B2
(45) Date of Patent: Sep. 15, 2026

(54) EXTENDABLE POSTURAL SUPPORT CUSHION

(71) Applicant: James Leckey Design Limited, Lisburn (GB)

(72) Inventors: Michelle O'Doherty, Lisburn (GB); James Gilmour, Lisburn (GB); Chris Summerhill-Rutter, Lisburn (GB)

(73) Assignee: James Leckey Design Limited, Lisburn (GB)

(*) Notice: Subject to any disclaimer, the term of this patent is extended or adjusted under 35 U.S.C. 154(b) by 0 days.

(21) Appl. No.: 17/810,047

(22) Filed: Jun. 30, 2022

(65) Prior Publication Data

US 2023/0000254 A1 Jan. 5, 2023

(30) Foreign Application Priority Data

Jul. 2, 2021 (GB) ..................................... 2109576

(51) Int. Cl.
*A47C 7/14* (2006.01)
*A61G 5/10* (2006.01)

(52) U.S. Cl.
CPC .............. *A47C 7/14* (2013.01); *A61G 5/1045* (2016.11)

(58) Field of Classification Search
CPC ........................................................ A47C 7/14
USPC ................ 297/284.3, 284.11, 452.21–452.28
See application file for complete search history.

(56) References Cited

U.S. PATENT DOCUMENTS 4,588,229 A * 5/1986 Jay ..................... A61G 7/05715 297/452.25 X
4,630,863 A * 12/1986 Roberts ................ A47C 27/001 297/452.25 X
4,643,481 A * 2/1987 Saloff ................ A61G 7/05715 297/452.25 X
4,773,703 A * 9/1988 Krugener ................. B60N 2/62 297/284.3
5,171,062 A * 12/1992 Courtois .................. B60N 2/62 297/284.11 X
5,370,444 A * 12/1994 Stulik ...................... A47C 7/18 297/284.11 X
5,378,045 A * 1/1995 Siekman .............. A61G 5/1043 297/452.21 X
5,421,047 A * 6/1995 Sabia ..................... A61G 5/124 297/284.3
5,461,741 A * 10/1995 Graebe ................ A47C 27/146 297/284.3 X
5,520,438 A * 5/1996 Stulik .................... A47C 1/023 297/284.11 X
5,906,416 A 5/1999 Rasmussen
5,950,263 A * 9/1999 Hanson ................ A61G 5/1045 297/452.21

(Continued)

OTHER PUBLICATIONS

United Kingdom Search Report, mailed Jan. 4, 2022, from Application No. GB2109576.5 filed Jul. 2, 2021.

*Primary Examiner* — Rodney B White
(74) *Attorney, Agent, or Firm* — Workman Nydegger

(57) ABSTRACT

An extendable cushion assembly includes a cushion that is movable between an extended state and a retracted state, and a base upon which the cushion is removably coupled. The base is movable between an extended state and a retracted state. When the cushion is coupled to the base and when the base adopts the extended state or the retracted state the cushion is configured to adopt the extended or the retracted state respectively.

13 Claims, 9 Drawing Sheets

(56) References Cited

U.S. PATENT DOCUMENTS

| | | | | |
|---|---|---|---|---|
| 6,033,024 | A * | 3/2000 | Pfau | A47C 7/20 297/452.26 X |
| 6,106,063 | A * | 8/2000 | Dauphin | A47C 1/023 297/284.11 |
| 6,139,109 | A * | 10/2000 | Lajoie | B60N 2/686 297/452.25 X |
| 6,256,819 | B1 * | 7/2001 | Maier | A61G 7/05715 297/452.26 X |
| 6,378,947 | B1 * | 4/2002 | Barber | A61G 5/12 297/452.25 X |
| 6,543,844 | B1 * | 4/2003 | Ryan | A61G 5/1048 297/452.26 X |
| 6,890,030 | B2 * | 5/2005 | Wilkerson | A47C 1/023 297/284.11 X |
| 7,104,609 | B2 * | 9/2006 | Kim | B60N 2/79 297/284.11 X |
| 7,140,057 | B2 * | 11/2006 | Hetzel | A61G 5/1043 297/452.26 X |
| 7,373,678 | B2 * | 5/2008 | Hetzel | A47C 7/021 297/452.26 X |
| 7,669,928 | B2 * | 3/2010 | Snyder | B60N 2/0284 297/284.11 X |
| 7,669,929 | B2 * | 3/2010 | Simon | B60N 2/62 297/284.11 |
| 7,712,837 | B2 * | 5/2010 | Ekornes | A47C 27/146 297/452.47 |
| 7,997,648 | B2 * | 8/2011 | Becker | B60N 2/0284 297/284.11 |
| 8,566,987 | B1 * | 10/2013 | Burge | A47C 7/024 297/452.26 X |
| 8,991,921 | B2 * | 3/2015 | Peterson | A47C 1/023 297/284.11 |
| 9,021,637 | B1 * | 5/2015 | Whelan | A61G 7/057 297/452.25 X |
| 9,039,085 | B2 * | 5/2015 | Aselage | B60N 2/0284 297/284.3 |
| 9,095,221 | B1 * | 8/2015 | Tiffany | A47C 17/04 |
| 9,809,132 | B2 * | 11/2017 | Bortolon | B60N 2/62 |
| 10,773,624 | B2 * | 9/2020 | Morrow | B60N 2/62 |
| 11,319,075 | B1 * | 5/2022 | Malecha | B60N 2/0284 |
| 2001/0004164 | A1 * | 6/2001 | Mattsson | B60N 2/829 297/284.11 X |
| 2005/0116440 | A1 | 6/2005 | Bernatsky et al. | |
| 2006/0138849 | A1 * | 6/2006 | Wilkerson | A47C 31/02 297/452.56 |
| 2008/0157578 | A1 * | 7/2008 | Snyder | B60N 2/62 297/311 |
| 2009/0302652 | A1 * | 12/2009 | Yamada | B60N 2/30 297/284.11 |
| 2011/0163583 | A1 * | 7/2011 | Zhong | B60N 2/62 297/337 |
| 2013/0127127 | A1 | 5/2013 | Vainutis et al. | |
| 2016/0137104 | A1 * | 5/2016 | Bortolon | B60N 2/0284 297/284.11 |
| 2018/0064593 | A1 | 3/2018 | Meyer et al. | |
| 2019/0029439 | A1 | 1/2019 | Wagner et al. | |

* cited by examiner

EXTENDABLE POSTURAL SUPPORT CUSHION

FIELD OF THE INVENTION

This invention relates to an extendable support cushion and in particular an extendable support cushion suitable for attachment to a support apparatus or the like.

BACKGROUND TO THE INVENTION

Wheelchairs and other seated user support apparatus are typically provided with generic cushioning which is not adaptable to the users' specific dimensions. This typically comprises a generic one piece cushion and as users may be seated in a wheelchair or the like for extensive periods each day, the generic cushion can become quite uncomfortable. Further these types of generic cushions offer fairly limited support to the user's body portions. One attempt to address these issues which is commonly implemented is the provision of custom wheelchairs with custom cushion and/or support element arrangements. These custom arrangements, whilst well suited to the particular user they are created for, are very expensive, are limited to the dimensions of the user when they were created which is not ideal if the intended user of the chair is a child whose dimensions will change very quickly as they grow older, as after a certain period of the time the chair, specifically the custom cushions and/or support elements will no longer be suitable for the user.

It is a desire of the present invention to provide a cushion arrangement which addresses the deficiencies mentioned above.

SUMMARY OF THE INVENTION

A first aspect of the present invention provides an extendable cushion assembly, comprising:

A cushion which is movable between an extended state and a retracted state; and

A base upon which the cushion is removably coupled;

Wherein the base is movable between an extended state and a retracted state;

Wherein when the cushion is coupled to the base, when the base adopts the extended state or the retracted state the cushion is configured to adopt the extended or the retracted state respectively.

Ideally, wherein the cushion comprises a plurality of transverse slits.

Preferably, wherein the cushion comprises a plurality of rows of the transverse slits.

Ideally, one or more of the plurality of rows do not extend up to either edge of the cushion and wherein one more of the plurality of rows do extend up to the edges of the cushion on both sides, wherein the slits which extend to the edges on either side define open ended slits.

Preferably, the cushion comprises an attachment means for coupling the cushion to the base.

Ideally, the base comprises an attachment means for coupling the cushion to the base.

Preferably, the cushion and base comprise respective co-operable attachment means for coupling the cushion to the base.

Ideally, further comprising one or more support portions for supporting one or more body parts of a user.

Preferably, the one or support portions are shaped and dimensioned to substantially conform, at least in part, to the one or more body parts of the user which they are configured to support.

Ideally, the one or more support portions comprise:

A thigh support; and/or

A posterior support; and or

A seat support.

Preferably, the one or more support portions comprise attachment means for coupling to the base and cushion respectively.

Ideally, further comprising a coupling portion, wherein the coupling portion comprises means for attachment to the base and means for attachment of the one or more support portions to the coupling portion, the one or more support portions further comprising means for attachment to the cushion.

Preferably, the base comprises means for attachment to a support apparatus.

A second aspect of the present invention provides a support apparatus comprising at least one extendable cushion assembly as recited in any previous statement of invention.

Ideally, wherein the support apparatus comprises a wheelchair.

Preferably, wherein the wheelchair comprises first and second extendable cushion assemblies, wherein the first cushion assembly comprises a base cushion of the wheelchair and the second cushion assembly comprises a back cushion of the wheelchair.

BRIEF DESCRIPTION OF THE DRAWINGS

The present invention will now be described by way of example with reference to the accompanying drawings in which.

DETAILED DESCRIPTION

Figure 1:
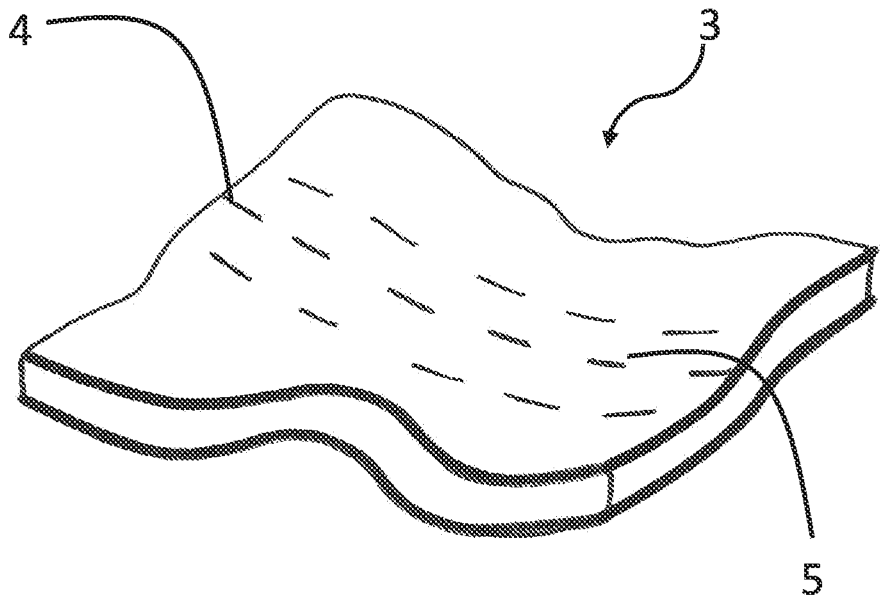
FIG. 1 is a perspective view showing a cushion in a retracted state.
Figure 2:
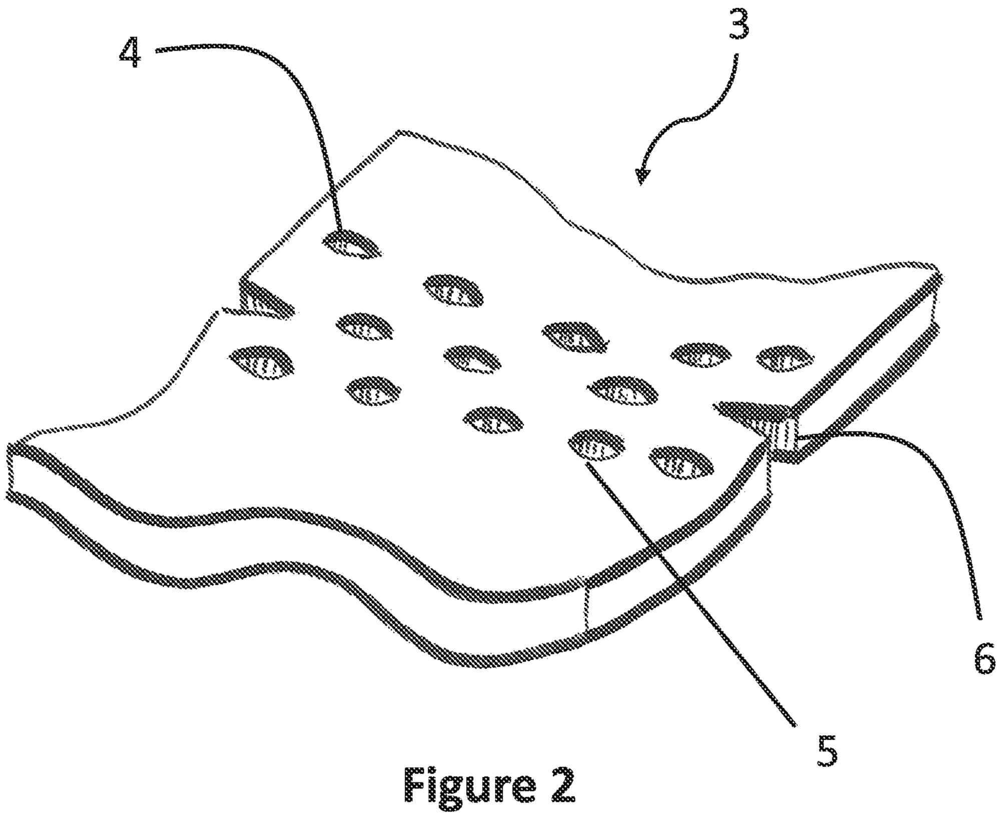
FIG. 2 is a perspective view showing the cushion in an extended state.

Referring to the drawings, in particular FIG. 1 and FIG. 2, there is shown, generally indicated by the reference numeral 1, a cushion 3. The cushion 3 may comprise one or more cushions of a seat. For example, the cushion 3 may comprise a seat cushion, i.e. a cushion upon which a person sits in-use, however additionally or alternatively it may also be a back cushion, i.e. a cushion which supports a user's back in-use. The cushion 3 shown in FIGS. 1 and 2 is more ideally suited as a seat cushion. The cushion 3 comprises a plurality of transverse slits 5. The slits 5 being arranged such that they extend transverse the cushion 3 in a semi-continuous fashion. The cushion 3 comprises a plurality of rows 4 of the transverse slits. The rows are spaced apart with respect to one another and are arranged such that they extend parallel to one another. The rows extend in a perpendicular direction to the length of the cushion 3. The cushion 3 is movable between a retracted state as shown in FIG. 1 and an extended state as shown in FIG. 2. Upon opening of the slits 5 the cushion 3 is configured to extend longitudinally, thereby varying the cushion 3 between the retracted and extended states. In FIGS. 1 and 2 there is shown a cushion comprising three rows of slits however this is for illustrative purposes only, it should be understood that the cushion could comprise more or less rows depending on the size of the cushion in-use.

One or more of the plurality of rows do not extend up to either edge of the cushion 3 and one more of the plurality of rows do extend up to the edges of the cushion on both sides, wherein the slits which extend to the edges on either side define open ended slits 6. As is shown in FIG. 1 and FIG. 2 typically in every other row the slits will extend up to the edges of the cushion on both sides to define the open ended slits 6. Advantageously this maintains structural integrity of the cushion whilst also allowing for a stable extension and retraction of the cushion 3. The cushion 3 is typically made of one or more layers of foam which are joined together by adhesive and/or heat sealing.

Figure 3:
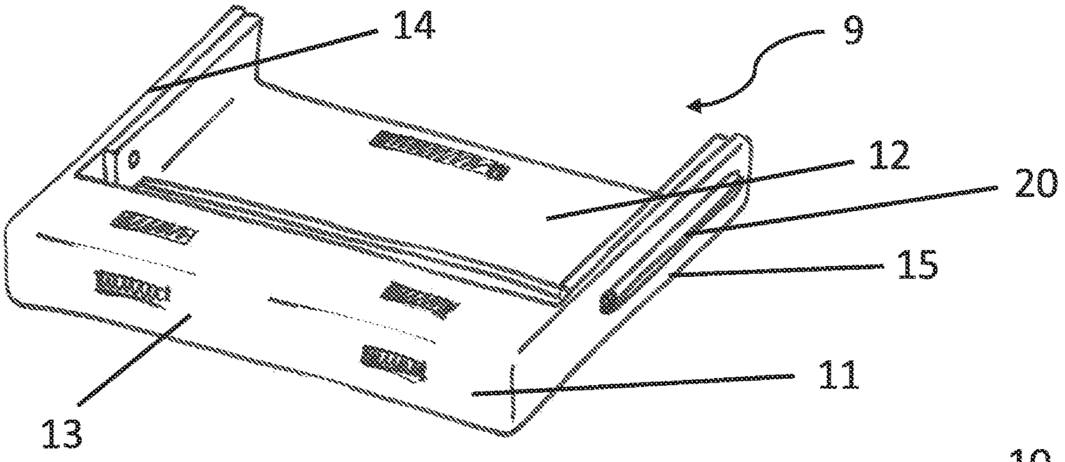
FIG. 3 is a perspective view showing a base in a retracted state.
Figure 4:
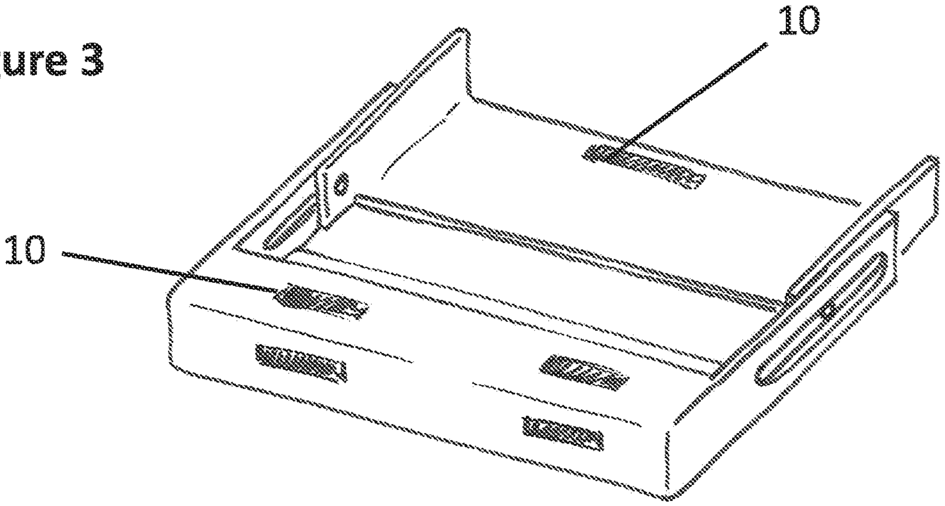
FIG. 4 is a perspective view showing the base in a first extended state.
Figure 5:
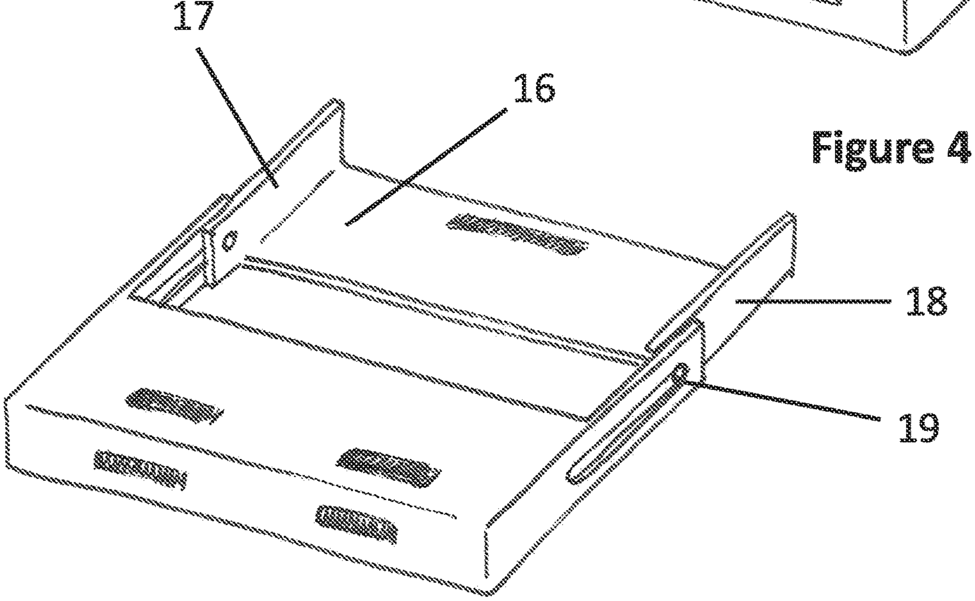
FIG. 5 is a perspective view showing the base in a second extended state.

Referring now to FIG. 3 there is shown a first embodiment of a base 9 to which the cushion 3 may be coupled, typically releasably coupled, by a suitable attachment means 10 comprising for example co-operative hook and loop fasteners or adhesive or any other suitable attachment means. The base 9 is movable between a retracted state, such as shown in FIG. 3, and one or more extended states such as shown in FIGS. 4 and 5 respectively. The first embodiment of the base 9, shown in FIGS. 3 to 5, comprises a first part 11 and a second part 12 which are slidable with respect to one another. A plurality of attachment means 10 may be provided upon the first and second parts 11, 12 of the base 9.

The first part 11 comprises a forward section 13, with two opposing side walls 14, 15 which extend away from the forward section 13, parallel with respect to one another in the same direction, such that the first part 11 is substantially u-shaped. The forward section 13 is substantially cuboidal in shape. The two opposing side walls 14, 15 of the first part 11 each comprise a respective channel 20 within which the second part 12 is configured to displace. To this end, the second part 12 typically comprises a bottom part 16 with two opposing side walls 17, 18 which upstand from opposing edges of the bottom part 16 such that the second part 12 is substantially trough-shaped. The side walls 17, 18 of the second part 12 comprise respective male members 19, which are provided on their outward faces, which are configured to slide within the channels 20 provided in the opposing side walls 14, 15 of the first part 11 such that the first part 11 can slide longitudinally with respect to the second part 12 and vice-versa such as to vary the base 9 between the extended and retracted states such as is shown in FIGS. 3 to 5. The male members 19 may comprise any suitable member such as but not limited to a pin, or screw or any other suitable member. In an alternative embodiment (not shown) the male member 19 may be provided upon the first part 11 with the second part 12 having a female member, i.e. a channel, to allow for the sliding movement of the second part 12 with respect to the first part 11.

Figure 6:
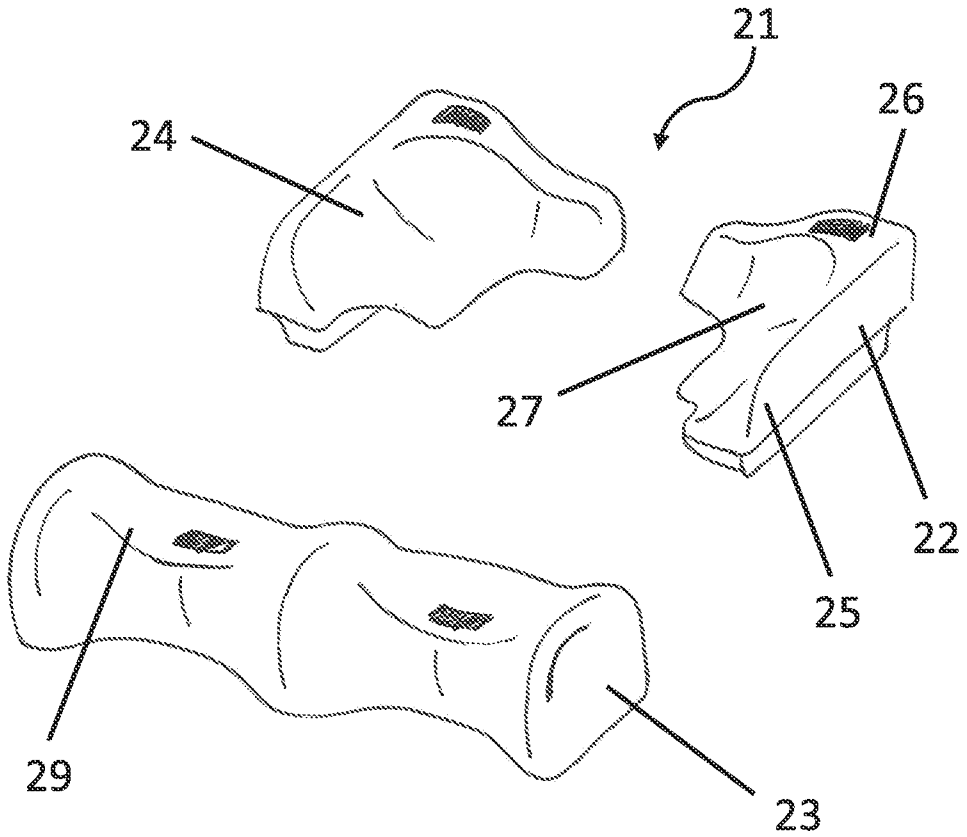
FIG. 6 is a perspective view showing a plurality of support portions.

FIG. 6 shows a plurality of support portions 21 for supporting one or more body parts of a user in-use. To this end the support portions 21 are shaped and dimensioned to substantially conform, at least in part, to one or more body parts of a user which they are configured to support. The support portions 21 may be shaped to the specific dimensions of a particular user or they may be shaped more generally to conform to the average dimensions of a user of a particular age, height, weight or the like. The one or more support portions 21 comprise attachment means for coupling to the attachment means 10 provided on the base for coupling the one or more support portions 21 to the base 9 and/or cushion 3 respectively. The attachment means 10 comprising for example co-operative hook and loop fasteners or adhesive or any other suitable attachment means as mentioned previously.

Referring again to FIG. 6, there are shown two different types of support portions 21, a posterior support 22 configured to support a user's posterior and a thigh support 23 configured to support a user's thighs in-use. To this end, the posterior support 22 comprises first and second portions 24 and 25 which are configured to support either side of a user's posterior in-use. The first and second portions 24 and 25 are typically substantially right angled in shape, each having an upstanding right angled edge 26 from which an inner depression 27 extends downwards and away therefrom. In-use the posterior support 22, when coupled to the base 9 and/or cushion 3, is configured to support a user's posterior with either side of the user's posterior being seated within the respective inner depressions 27 with the right-angled edges 26 aiding in retaining the user's posterior within the posterior support 22.

The thigh support 23 comprises a substantially semi-cylindrical portion typically having one or more concave depressions 29 formed on one or more surfaces thereof to aid in seating the user's thigh in-use. Accordingly, the thigh support 23 may be formed in a singular piece with separate depressions formed therein for each thigh of the user, or it may be made of two parts which are releasably coupleable together via a suitable attachment means 10, comprising for example co-operative hook and loop fasteners or adhesive or any other suitable attachment means.

Figure 7:
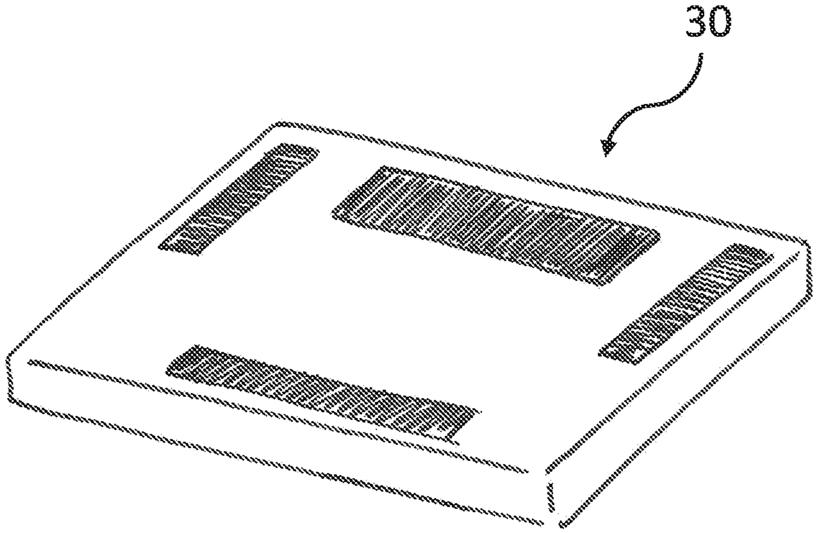
FIG. 7 is a perspective view showing a coupling portion.

FIG. 7 shows a coupling portion 30 configured to provide a planar surface upon which to attach one or more of the support portions 21. To this end the coupling portion 30 comprises means for attachment to the base 9 and means for attachment to one or more of the more support portions 21. The one or more support portions 21 further comprising means for attachment to the cushion 3. Each of these means of attachment may comprise co-operative hook and loop fasteners or adhesive or any other suitable attachment means.

Figure 8:
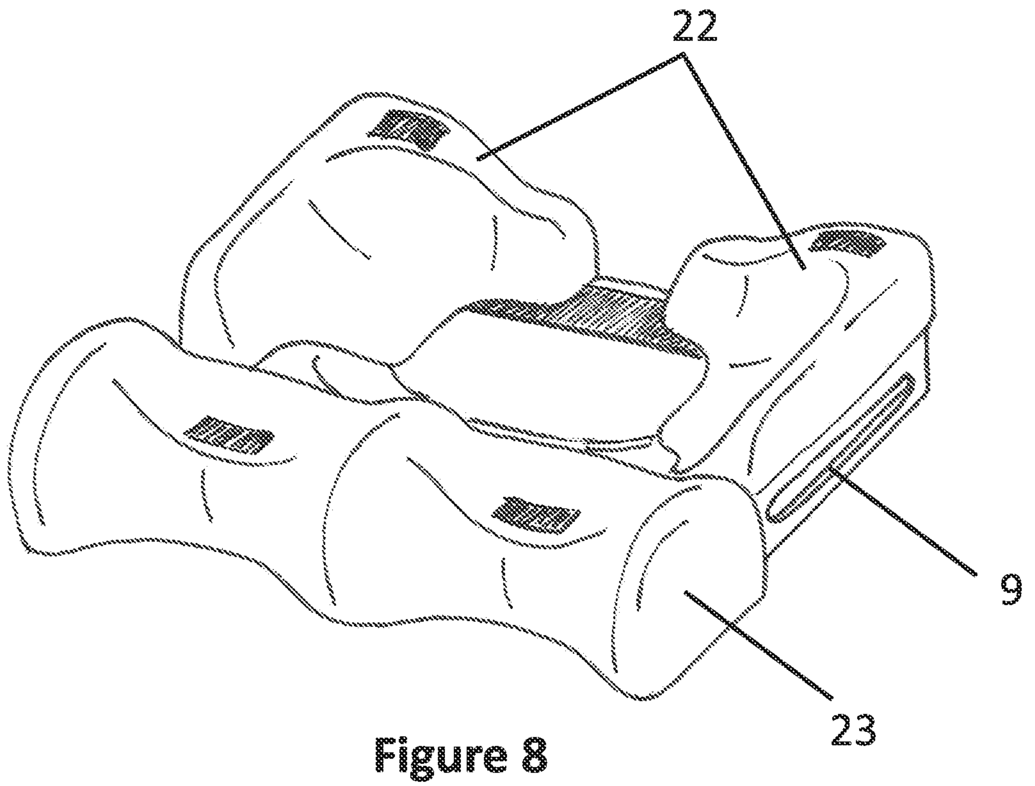
FIG. 8 is a perspective view showing the plurality of support portions coupled to the coupling portion which is in turn coupled to the base with the base in the retracted state.
Figure 9:
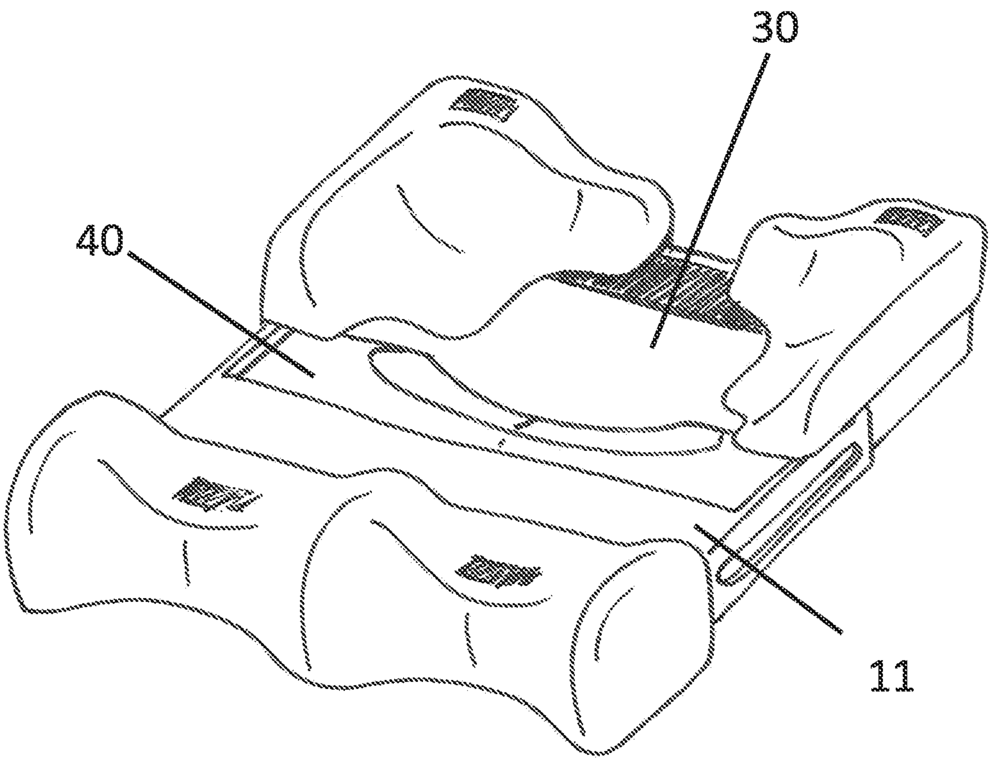
FIG. 9 is a perspective view showing the plurality of support portions coupled to the coupling portion which is in turn coupled to the base with the base in the extended state.

FIGS. 8 and 9 show the support portions 21, coupling portion 30 and base 9 coupled together with the base 9 being shown in the retracted and extended states respectively. As can be seen in the figures the coupling portion 30 may be seated, typically coupled thereto, at least in part, on top of the bottom part 16 of the second part 12 of the base 9. Advantageously, as can be seen in FIG. 9 when the coupling portion is seated on top of the bottom part 16 the upper surface of the coupling portion 30 typically lies substantially flush with the upper surface of the forward section of the first part 11 such as to define a substantially flush surface across both first and second parts 11 and 12 of the base 9. Advantageously, the flush surface provides a good mounting surface upon which to couple the support portions 21. To this end, the posterior support 22 may be coupled upon opposing sides of the top surface of coupling portion 30, typically at the end of the coupling portion 30 which is furthest away from the first part 11 of the base 9. Additionally the thigh support 23 is typically coupled to the top surface of the forward section 13 of the first part 11 of the base 9. Advantageously, as the base is retractable/extendable this provides means by which a user can adjust the distance between the posterior and thigh supports 22, 23 to suit their particular dimensions.

Figure 10:
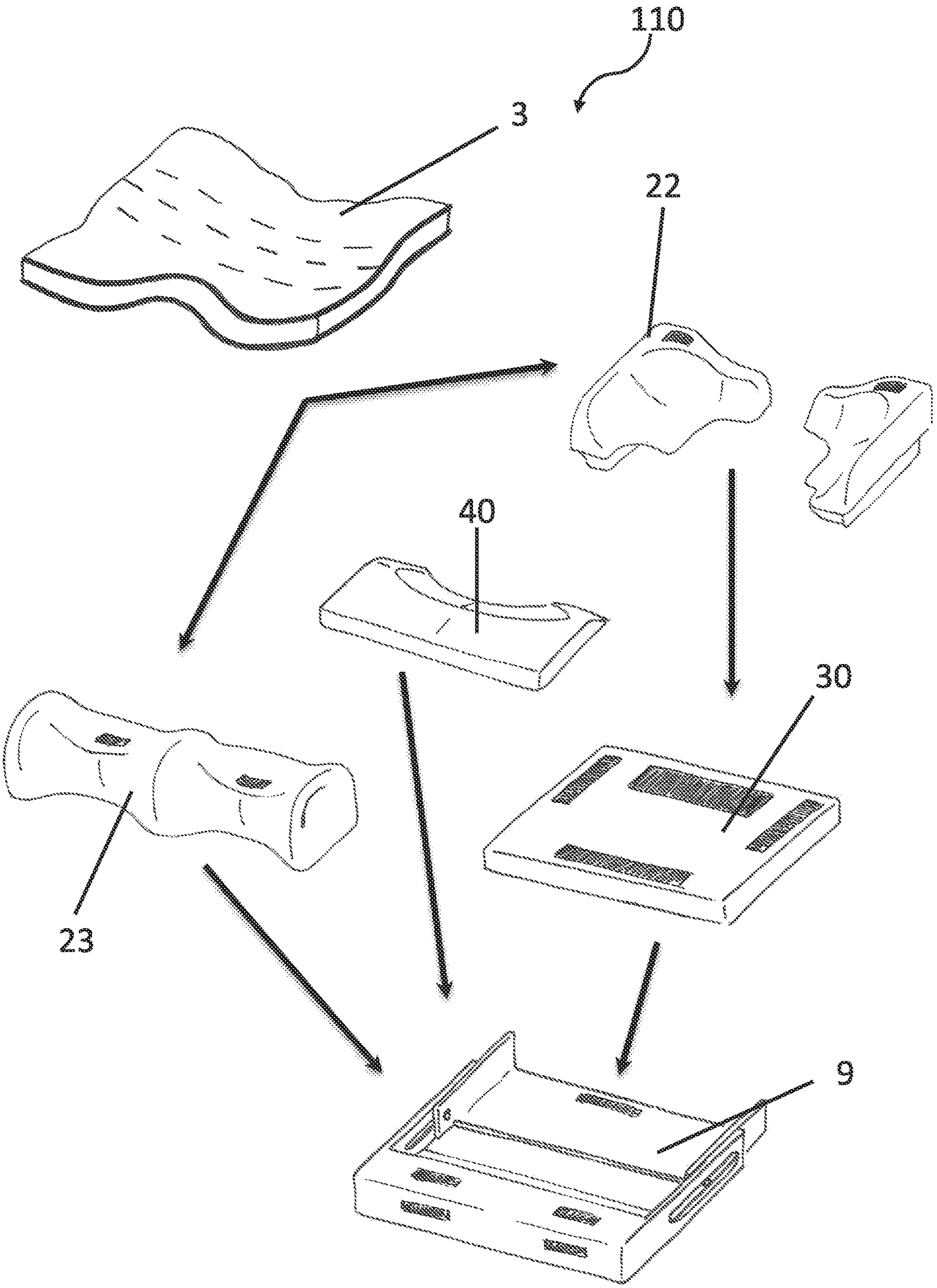
FIG. 10 is an exploded view of the an extendable cushion assembly showing the cushion, support portions, coupling portion and base.

FIG. 10 is an exploded view showing the various elements of a first extendable cushion assembly of the present invention generally indicated by the reference numeral 110. The extendable cushion assembly 50 may further comprise a further bracing portion 40. The bracing portion 40 is typically coupleable to the coupling portion 30, in particular typically the top surface of the coupling portion 30 between the posterior support 20 coupled to top surface of the coupling portion 30 at the end furthest from the first part 11 and the thigh support 23 coupled to the first part 11, upon the top surface of the forward section 13. The bracing portion 40 further supporting the lower portion of the user's body from their posterior to their thighs when seated in-use. To this end the support portions 21 each typically comprise attachment means 10 provided on a upper surface to which the cushion 3 is releasably coupleable. The cushion 3 dampening the substantially hard surfaces of the support portions 21 in-use, providing greater overall comfort for the user.

Figure 11:
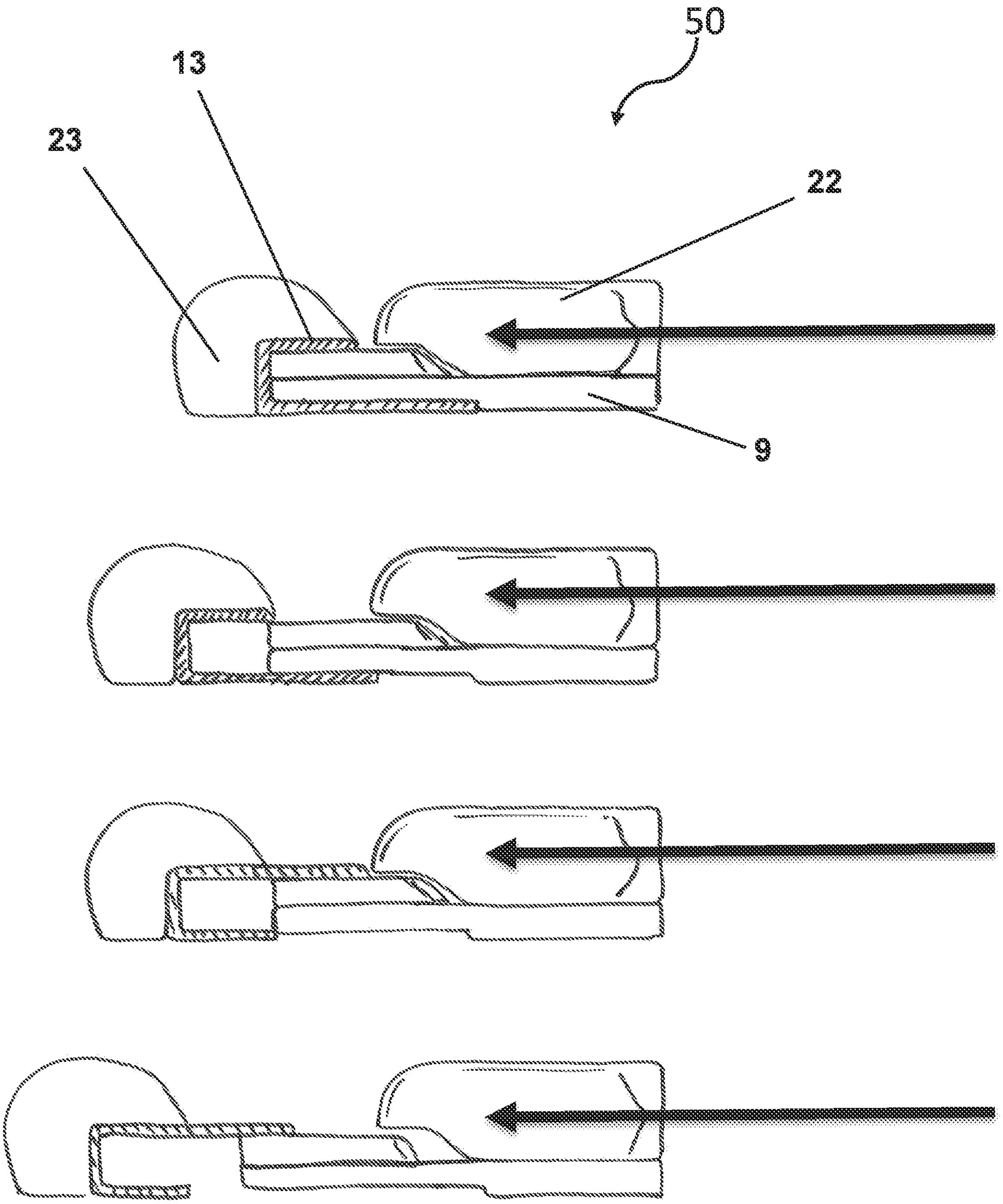
FIG. 11 is a cross sectional view showing the displacement of the base 9 from the retracted state to the extended state.

FIG. 11 is a cross sectional view showing the displacement of the first extendable cushion assembly 110 from the retracted state to the extended state generally indicated by the reference numeral 50.

Figure 12:
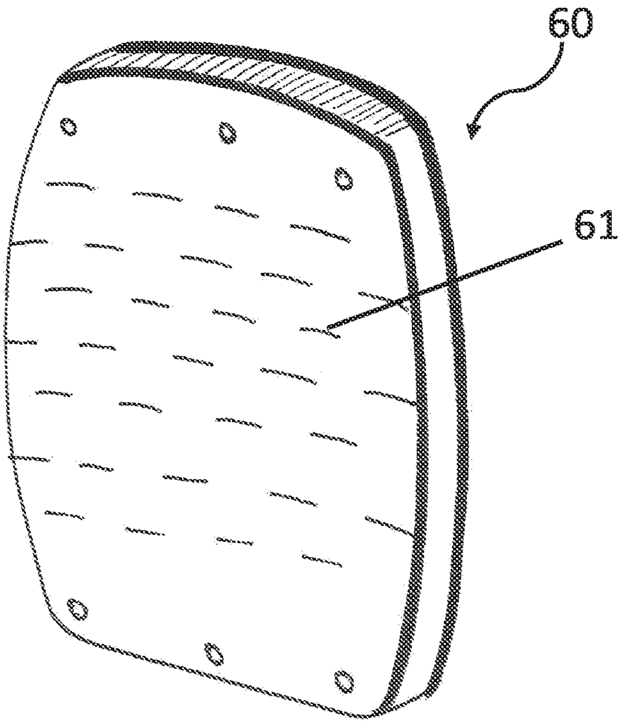
FIG. 12 shows an alternative embodiment of the cushion in the retracted state.
Figure 13:
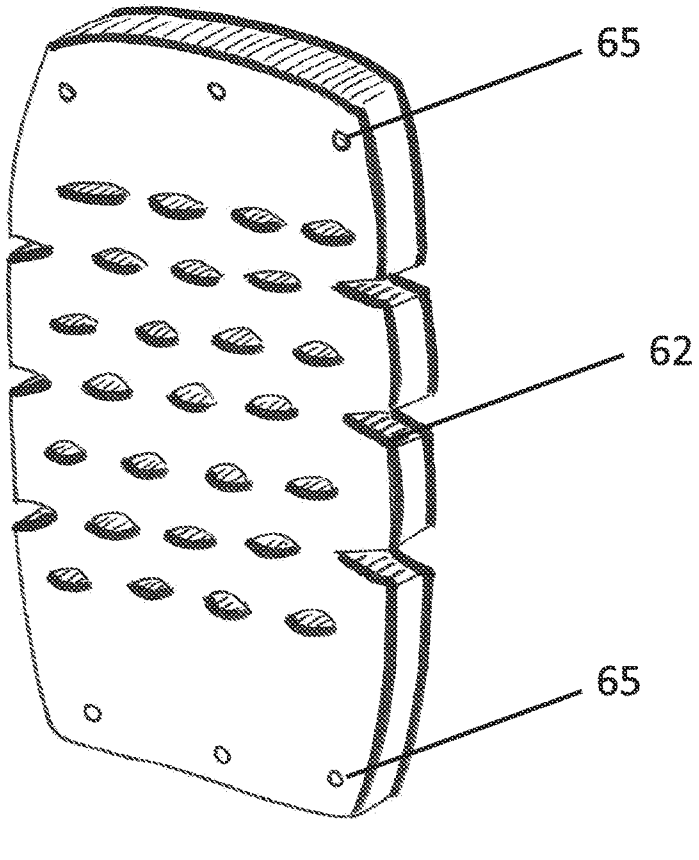
FIG. 13 shows the alternative embodiment of the cushion in the extended state.

FIGS. 12 and 13 show a second embodiment of the cushion generally indicated by the reference numeral 60. The cushion 60 is ideally suited for use as a back cushion, i.e. a cushion which supports a user's back in-use. The cushion 60 comprises a plurality of transverse slits 61. The slits 61 being arranged such that they extend transverse the cushion 60 in a semi-continuous fashion. The cushion 60 comprises a plurality of rows of the transverse slits. The rows are spaced apart with respect to one another and are arranged such that they extend parallel to one another. The rows extend in a perpendicular direction to the length of the cushion 60. The cushion 60 is movable between a retracted state as shown in FIG. 12 and an extended state as shown in FIG. 12. Upon opening of the slits 61 the cushion 60 is configured to extend longitudinally, thereby varying the cushion 60 between the retracted and extended states. In FIGS. 12 and 13 there is shown a cushion comprising seven rows of slits however this is for illustrative purposes only, it should be understood that the cushion could comprise more or less rows depending on the size of the cushion in-use.

One or more of the plurality of rows do not extend up to either edge of the cushion 60 and one more of the plurality of rows do extend up to the edges of the cushion 60 on both sides, wherein the slits which extend to the edges on either side define open ended slits 62. As is shown in FIG. 12 and FIG. 13 typically in every other row the slits will extend up to the edges of the cushion on both sides to define the open ended slits 62. Advantageously this maintains structural integrity of the cushion whilst also allowing for a stable extension and retraction of the cushion 60. The cushion 60 is typically made of one or more layers of foam which are joined together by adhesive and/or heat sealing. The cushion 60 is typically longer than the cushion 3 shown in FIGS. 1 and 2 as the cushion 60 is configured to support a user's back in-use. The cushion 60 comprises an attachment means 65 for releasably coupling the cushion 60 to a base 70. The attachment means 65 typically comprises a female member, typically a plurality of reinforced holes, which are ideally provided at opposing ends of the cushion 60, typically at the top and bottom ends thereof.

Figure 14:
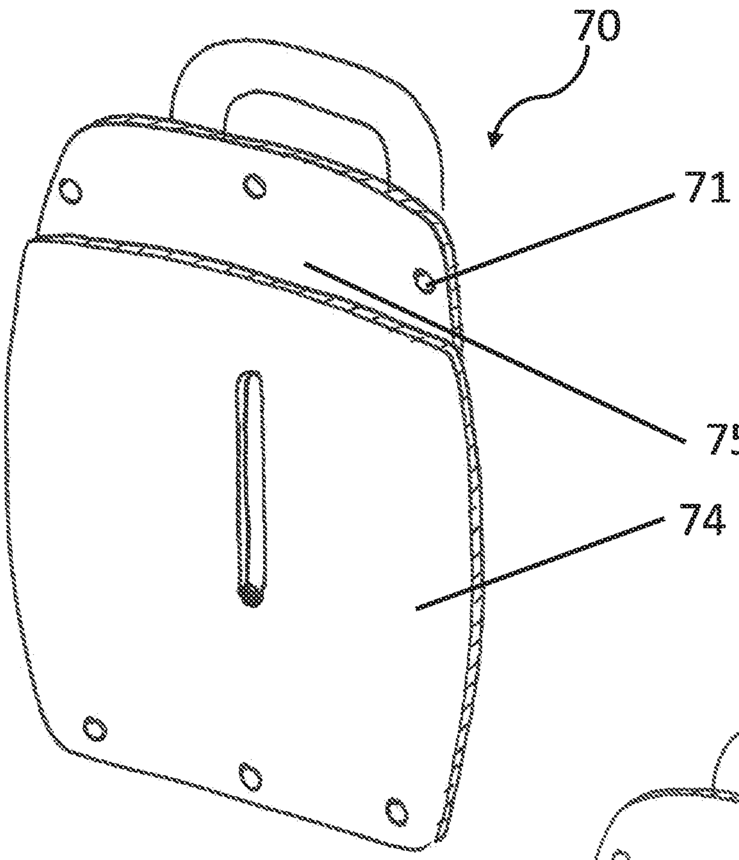
FIG. 14 shows an alternative base in the retracted state.
Figure 15:
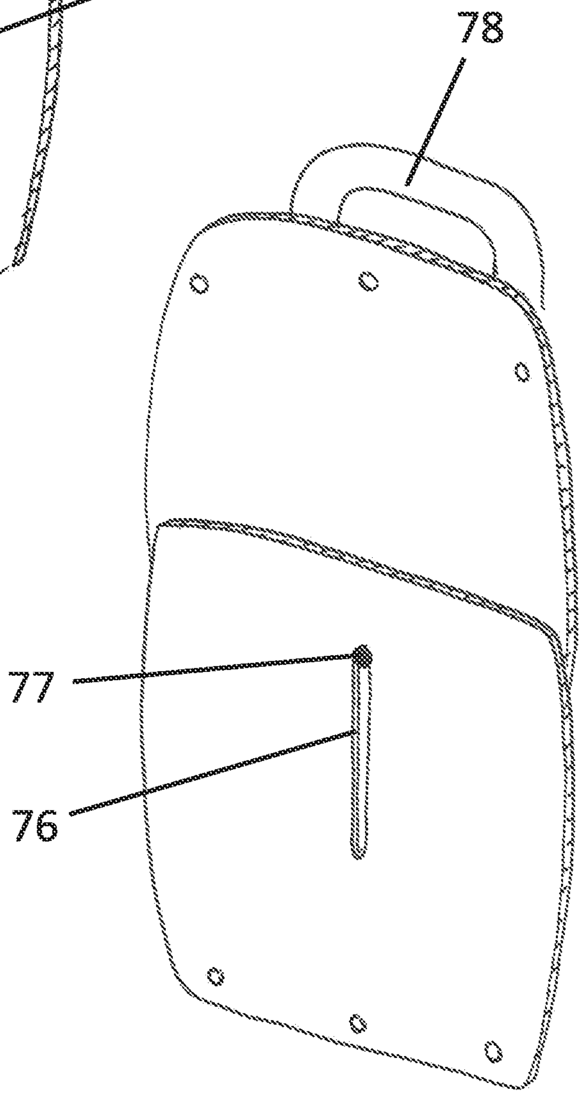
FIG. 15 shows an alternative base in the retracted state.

FIGS. 14 and 15 show an alternative embodiment of the base 70 which is co-operable with the cushion 60. The cushion 60 may be coupled, typically releasably coupled, by a suitable attachment means 71 which is co-operable with the attachment means 65 of the cushion 60. The attachment means 71 preferably comprises a male member such as pin or screw or the like which is configured to releasably engage with the female member of the cushion 60, alternatively the attachment means 71 may comprise co-operative hook and loop fasteners or adhesive or any other suitable attachment means. The base 70 is movable between a retracted state, such as shown in FIG. 14, and an extended state such as shown in FIG. 15. The second embodiment of the base 70, shown in FIGS. 14 and 15, comprises a first part 74 and a second part 75 which are slidable with respect to one another. A suitable attachment means couples the first and second parts 74 and 75 of the base 70 together. To this end the first part 74 of the base 70 typically comprises an elongate channel 76 within which a male member 77 of the second part 75 is configured to slide such as to provide longitudinal movement of the second part 75 relative to the first part 74 and vice versa. The length of the first part 74 is such that when the base 70 adopts the retracted state at least a portion of the second part 75 is always exposed such that the cushion 60 can be coupled to both the first and second parts 74, 75 when the base is in either of the retracted or extended states such as is shown in FIGS. 14 and 15 respectively. The second part 75 may further comprise a handle 78 or the like.

Figure 16:
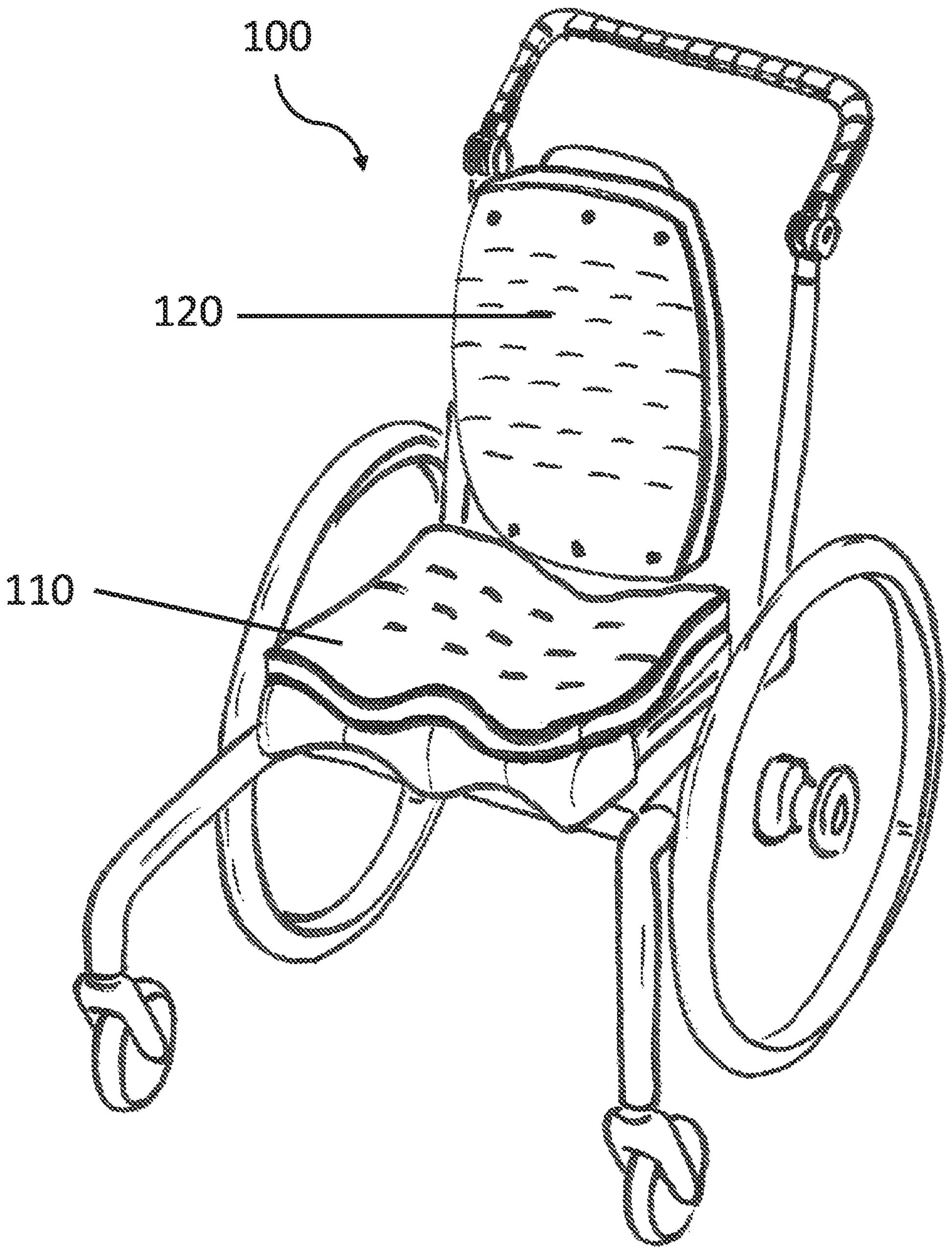
FIG. 16 is a perspective view of a support apparatus comprising first and second extendable cushion assemblies.

FIG. 16 shows a support apparatus generally indicated by the reference numeral 100. The support apparatus 100 may comprise at least one of the extendable cushion assemblies as mentioned previously. The support apparatus 100 typically comprises a wheelchair. The wheelchair comprises first and second extendable cushion assemblies, wherein the first extendable cushion assembly 110 comprises the first embodiment of the base 7 with at least the cushion 3 coupled thereto which is provided as the seat cushion of the wheelchair and the second extendable cushion assembly 120 comprises the second embodiment of the base 70 with the second embodiment of the cushion 60 coupled thereto which is provided as the back cushion of the wheelchair. In the embodiment shown in FIG. 16 the first extendable cushion assembly further comprises the coupled support portions 21 and bracing portion 40 as shown in FIG. 10.

Advantageously, the present invention provides extendable cushion assemblies which allow for extension and retraction of the cushion assemblies such that in-use, as can be best seen in FIG. 16, a support apparatus can be provided with extendable back and seat cushions which allows the user to adapt the support apparatus to their particular dimensions thereby ensuring a more comfortable and supporting apparatus for the user.

The invention is not limited to the embodiment(s) described herein but can be amended or modified without departing from the scope of the present invention.

The invention claimed is:

1. An extendable cushion assembly for a seated user support apparatus, comprising:

a cushion that is movable between an extended state and a retracted state;

a base upon which the cushion is removably coupled, the base comprising a first part and a second part that are slidable longitudinally with respect to one another between the extended state and the retracted state, wherein the first part comprises a forward section and two opposing side walls, and wherein the second part comprises a bottom part and two opposing side walls;

wherein the opposing side walls of the first part each comprise a channel and the opposing side walls of the second part each comprise a respective male member which is configured to slide within the respective channels; and a coupling portion removably coupled to the base and seated, at least in part, on top of the bottom part of the second part;

a posterior support and a thigh support removably coupled between the cushion and the base, wherein the posterior support is coupled to a top surface of the coupling portion, and wherein the thigh support is coupled to a top surface of the forward section of the first part;

wherein an upper surface of the coupling portion lies substantially flush with an upper surface of the forward section of the first part so as to define a substantially flush mounting surface across the first part and the second part of the base;

wherein the posterior support and the thigh support are shaped and dimensioned to substantially conform, at least in part, to one or more body parts of a user which they are configured to support;

wherein each of the posterior support and the thigh support comprises releasable coupling means on a lower side for attachment to the base or the coupling portion and on an upper side for attachment to the cushion; and wherein, when the cushion is coupled to the base and the base adopts the extended state or the retracted state, the cushion, the posterior support and the thigh support are configured to adopt corresponding extended or retracted positions, such that displacement of the first part relative to the second part varies a spacing between the posterior support and the thigh support in accordance with the user's dimensions.

2. The extendable cushion assembly of claim 1, wherein the cushion comprises a plurality of transverse slits.

3. The extendable cushion assembly of claim 2, wherein the cushion comprises a plurality of rows of the transverse slits.

4. The extendable cushion assembly of claim 3, wherein one or more of the plurality of rows do not extend up to either edge of the cushion and wherein one more of the plurality of rows do extend up to the edges of the cushion on both sides, wherein the slits which extend to the edges on either side define open ended slits.

5. The extendable cushion assembly of claim 1, wherein the cushion comprises an attachment means for coupling the cushion to the base.

6. The extendable cushion assembly of claim 1 wherein the base comprises an attachment means for coupling the cushion to the base.

7. The extendable cushion assembly of claim 1, wherein the cushion and base comprise respective co-operable attachment means for coupling the cushion to the base.

8. The extendable cushion assembly of claim 1, wherein the posterior support comprises first and second portions configured to support respective sides of a user's posterior, each said portion having an upstanding edge and an inner depression extending downwardly and away from the upstanding edge.

9. A seated user support apparatus comprising at least one extendable cushion assembly as recited in claim 1.

10. The seated user support apparatus of claim 9, wherein the support apparatus comprises a wheelchair.

11. The seated user support apparatus of claim 10, wherein the wheelchair comprises first and second extendable cushion assemblies, wherein the first cushion assembly comprises a base cushion of the wheelchair and the second cushion assembly comprises a back cushion of the wheelchair.

12. The extendable cushion assembly of claim 1, wherein the thigh support comprises a substantially semi-cylindrical portion having one or more concave depressions configured to receive a user's thighs.

13. The extendable cushion assembly of claim 1, further comprising a bracing portion coupled to a top surface of the coupling portion between the posterior support and the thigh support.

* * * * *